(12) United States Patent
Beigi

(10) Patent No.: US 7,474,770 B2
(45) Date of Patent: Jan. 6, 2009

(54) METHOD AND APPARATUS FOR AGGRESSIVE COMPRESSION, STORAGE AND VERIFICATION OF THE DYNAMICS OF HANDWRITTEN SIGNATURE SIGNALS

(76) Inventor: Homayoon S. M. Beigi, 3616 Edgehill Rd., Yorktown Heights, NY (US) 10598-1104

(*) Notice: Subject to any disclaimer, the term of this patent is extended or adjusted under 35 U.S.C. 154(b) by 654 days.

(21) Appl. No.: 11/160,530

(22) Filed: Jun. 28, 2005

(65) Prior Publication Data

US 2006/0291703 A1    Dec. 28, 2006

(51) Int. Cl.
*G06K 9/00* (2006.01)
*G06K 9/36* (2006.01)

(52) U.S. Cl. .................... 382/119; 382/232

(58) Field of Classification Search ................. 382/119, 382/173, 177, 187–188, 232, 244, 246, 251; 341/51, 65; 358/426.01; 73/865.4; 178/18.01, 178/18.03; 348/161
See application file for complete search history.

(56) References Cited

U.S. PATENT DOCUMENTS

| | | | |
|---|---|---|---|
| 4,005,878 A | 2/1977 | van Leer | |
| 5,428,210 A | 6/1995 | Nair et al. | |
| 5,434,919 A | 7/1995 | Chaum | |
| 5,448,044 A | 9/1995 | Price et al. | |
| 5,466,918 A | 11/1995 | Ray et al. | |
| 5,561,282 A | 10/1996 | Price et al. | |
| 5,892,824 A | 4/1999 | Beatson et al. | |
| 5,991,515 A * | 11/1999 | Fall et al. | 358/1.15 |
| 6,314,208 B1 * | 11/2001 | Konstantinides et al. | 382/239 |
| 6,549,675 B2 * | 4/2003 | Chatterjee | 382/244 |
| 7,085,420 B2 * | 8/2006 | Mehrotra | 382/232 |
| 7,302,106 B2 * | 11/2007 | Liu et al. | 382/242 |
| 7,308,148 B2 * | 12/2007 | Napper | 382/238 |

OTHER PUBLICATIONS

Beigi, Homayoon S. M., Pre-Processing the Dynamics of On-Line Handwriting Data, Feature Extraction and Recognition, Progress in Handwriting Recognition, 1997, pp. 191-198, Worl.

* cited by examiner

*Primary Examiner*—Daniel G Mariam
(74) *Attorney, Agent, or Firm*—Gordon & Jacobson, PC

(57) ABSTRACT

The fields of biometrics and commerce can benefit from the aggressive compression techniques presented here. A novel approach to compressing the on-line handwriting signal without losing the dynamic information (i.e., velocity and order) is presented which provides the means to fit almost any signature sample within the 57-byte limit of one of the free magnetic strips on the back of conventional transaction cards such as credit or debit cards or other identity cards. The apparatus requires an on-line signature capture tablet capable of sampling the handwritten signature in a series of sampled X and Y coordinates. The compression method starts with segmenting the on-line handwriting signal into portions which may be approximated with a set of features from which the velocity and position may be reconstructed. These features are then compressed further using standard compression techniques. A Huffman coding technique is used to demonstrate this step. The size of the average signature including its dynamic information is stored in a space less than 57 bytes which is the magic limit imposed by conventional, magnetic transaction (credit or debit) card strips. This is by far less than about 1000 bytes required if only loss-less techniques were used. A loss-less compression technique is also briefly presented. Normally, out of the three strips which are provided on the back of a card, two strips are available and may be used for storing the template of the owner's signature for future verification.

23 Claims, 8 Drawing Sheets

METHOD AND APPARATUS FOR AGGRESSIVE COMPRESSION, STORAGE AND VERIFICATION OF THE DYNAMICS OF HANDWRITTEN SIGNATURE SIGNALS

BACKGROUND OF THE INVENTION

1. Field of the Invention

This invention relates to the field of biometrics as well as storage and retrieval of the dynamics of handwriting on limited space media and it specifically relates to the storage, retrieval and verification of signatures preserving the dynamic information on small memory devices such as the back of a transaction card (credit, debit or ID card).

2. Description of the Related Art

In 1995, Kodak scientists presented an aggressive image compression technique for coding the photo of a credit card holder in one of the three 57-byte magnetic strips available on the back of conventional credit cards. A more important or perhaps complementary piece of information which should be stored on one of these strips is the signature of the individual. Currently, the signature is written on the back of the credit card and is available to any forger to see at the moment of making purchases. In addition, this is only a static image of the individual's signature and lacks the dynamic information such as velocity, order and pressure at different portions of the signature. This dynamic information can substantially increase automatic signature verification results.

In their patent (U.S. Pat. No. 5,466,918), Ray, et al. provide a method for storing a human image (a biometric on the back of a transaction card which allows less than 57 bytes of storage). Here, I provide a method and apparatus for storing the full dynamic information of an on-line signature on the same medium. This data may be used to render the image of the signature or to act as a biometric template verifying the full dynamics of the signer's motion while signing and not just the image. The image is easy to forge by practicing, but the dynamics such as changes in velocity at different locations in the signature are much harder to forge even for professional forgers. In a dynamic template the order of the points in the image is preserved as well as the speed at different points in each stroke of the signature.

Low quality tablets have recently been installed at many department store cash registers to obtain electronic signature samples from customers. These samples are, however, still being treated as images and their dynamic information is not being used. For on-line verification, part of the problem is the storage of the signature templates which would have to be done at a central location accessible to stores through a network. This would be an expensive system which although is quite warranted, will not be easily attainable in practice since many stores do not have network connectivity. A self-contained signature verification system would be made possible if the credit card of the individual included his or her signature sample electronically. The electronic information may also be used to render the signature on a screen for the store manager to review and compare against the individual's signature at the time of purchase.

Van Leer in his patent number U.S. Pat. No. 4,005,878 uses a moving surface while the signature is being created to change the shape of the signature to make forgeries hard. It uses the image of the signature and forfeits the usage of any dynamic information.

Nair, et al. in their patent number U.S. Pat. No. 5,428,210 discuss a scenario which requires that the signature (although compressed) be sent to a server to authenticate the cardholder. This is due to the inability of the compression scheme discussed the invention to produce small enough templates. Also, they again do not use the dynamic information of the signature. Price, et al. in their patent number U.S. Pat. No. 5,448,044 use the image of a signature. They talk about comparing the facsimile of the captured signature to the image signature signed on the back of the credit card. This does not use dynamic information. The dynamic information is quite important in reducing the possibility of a forgery. It also defeats the purpose of capturing the electronic signal since the forger will be able to see the signature on the back of the card and to practice forging it. Since only the image is used by an operator to match the two signatures, forgeries may be easily accomplished.

Beatson et al. in their patent number U.S. Pat. No. 5,892,824 are forced to use an IC card to be able to store the image of a signature as stated in their invention's description (stated toward the beginning of column 19). In this description they state that the image of the signature is different from the biometric template and state earlier in the patent that the image takes up about 500 bytes requiring an IC card. My invention provides a biometric template which not only includes the full dynamic information such as the velocity at different points in the signature (much harder to forge than just shape), it also provides an image of the signature to be displayed on the monitor of the merchant which may also be used by the merchant to verify the signature of the customer. This eliminates the need for having a handwritten signature in ink on the back of the credit card and makes the job of a forger much harder.

In this patent, as a matter of comparison, I will present a loss-less compression scheme which will produce coded signatures of requiring over 1000 bytes for coding an average on-line signature. This is not nearly enough for our objective of an upper limit of 57 bytes, but it certainly has its own applications.

SUMMARY OF THE INVENTION

In view of the foregoing and other problems, disadvantages, and drawbacks of the conventional systems and techniques, the present invention has been devised, and it is object of the present invention to provide a structure and method for storing the dynamic information of the handwriting (signature) on limited space media such as the magnetic strip on the back of a transaction (credit, debit or identity) card with the capability to reconstruct the image of the signature as well as the full dynamic information to be used for verification purposes.

To attain the objects above, according to one aspect of the invention, a computer-implemented method for modeling and encoding the dynamics of the handwritten signature, includes the feature extraction of the signature based on an input from a stylus pen capable of producing a sequence of coordinates sampled through time and presented to a CPU to process and produce a set of parameters representing the dynamics of the signature as well as its shape and which fit on average in less than 57 bytes which is the limit imposed by the space available on the magnetic strip on the back of conventional transaction cards. This information is then stored on the back of the transaction card at the time of registering the transaction card at the issuing institution or affiliates as the template of the signature of the holder of the card. At the time of usage, the information is retrieved from the back of the transaction card and may be used to reconstruct the signature in its entirety including the image of the signature and all its dynamic information. The dynamic information is generally much harder to forge than the image of the signature since any forger, by practicing, can learn to forge the shape of a signature in time. However, the forger will not be readily able to forge the speeds at the different locations of the trace of the signature. This information without the presented compression would amount in average to over 1000 bytes of information which is not storable on conventional transaction cards and hence has generated ideas by other inventors in using devices with more memory such as smart-cards. This invention eliminates the need for such media (smart cards and extra memory) and allows conventional credit cards with conventional systems to be used to attain this goal with great efficiency.

A methodology is presented her for compressing all the dynamic information within an average signature to less than 57 bytes so that it may be included on the back of a credit card. In addition, it requires less storage than storing the actual x and y coordinates and it maintains all the dynamic information as well. In addition to biometric applications, since the order and velocity information are conserved, stored on-line handwriting data may be used by on-line recognizers without much degradation in accuracy results. The promised lossy compression technique is formulated by first segmenting the signature into smaller pieces. Each piece is subsequently modeled by only six or less parameters. These parameters may be further compressed using quantization and tabulation. Finally, Huffman coding scheme is used to further reduce the size of the signature code.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
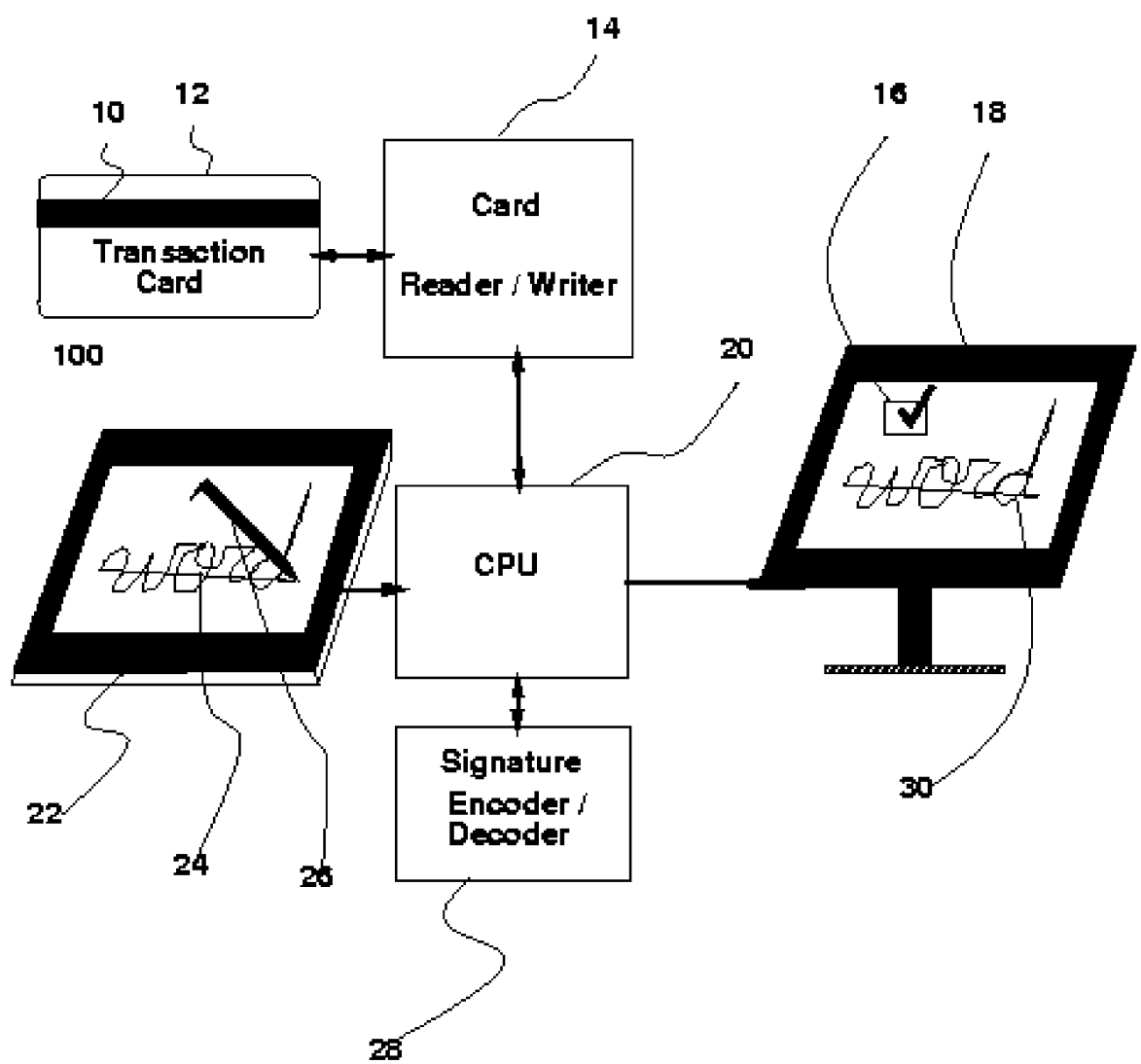
FIG. 1 is an overall block diagram of a system 100 according to present invention.

Referring now to the drawing, and more particularly to FIGS. 1-8, there is shown a preferred embodiment of the method and structures according to the present invention.

Preferred Embodiment

Referring to FIGS. 1-8, a preferred embodiment of the present invention will be described below.

In FIG. 1, a schematic block diagram of the inventive system 100 is shown. System 100 includes an input device (digitizer tablet) 22 comprising a digital pen 26. The on-line signature 24 is entered by writing on the digitizer tablet using the digital pen. A Central Processing Unit (CPU) 20 is used to perform the needed temporary storage, computation and communication with other devices. One such device is the Card Reader/Writer 14 which is used to read or write information from/to the magnetic strips 10 on the back of a transaction card 12. Another device attached to the CPU is the display unit 18 which provides visual feedback to the merchant or operator at the time of the transaction. The system presented by this invention is capable of displaying the signature coded on the back of the transaction card 30 as well as the signature being entered by the patron at the time of the usage of the table 22 and pen 26. The system which performs the coding and decoding of the dynamics and the image of the signature is given in block 28. This system is also capable of verifying the signature of the patron 24 against the signature stored on the magnetic strip 10 and to display the verification results 16 on the monitor 18.

In order to be able to code the dynamics of the signature, one should understand the process of writing as it happens inside the human system.

Figure 2:
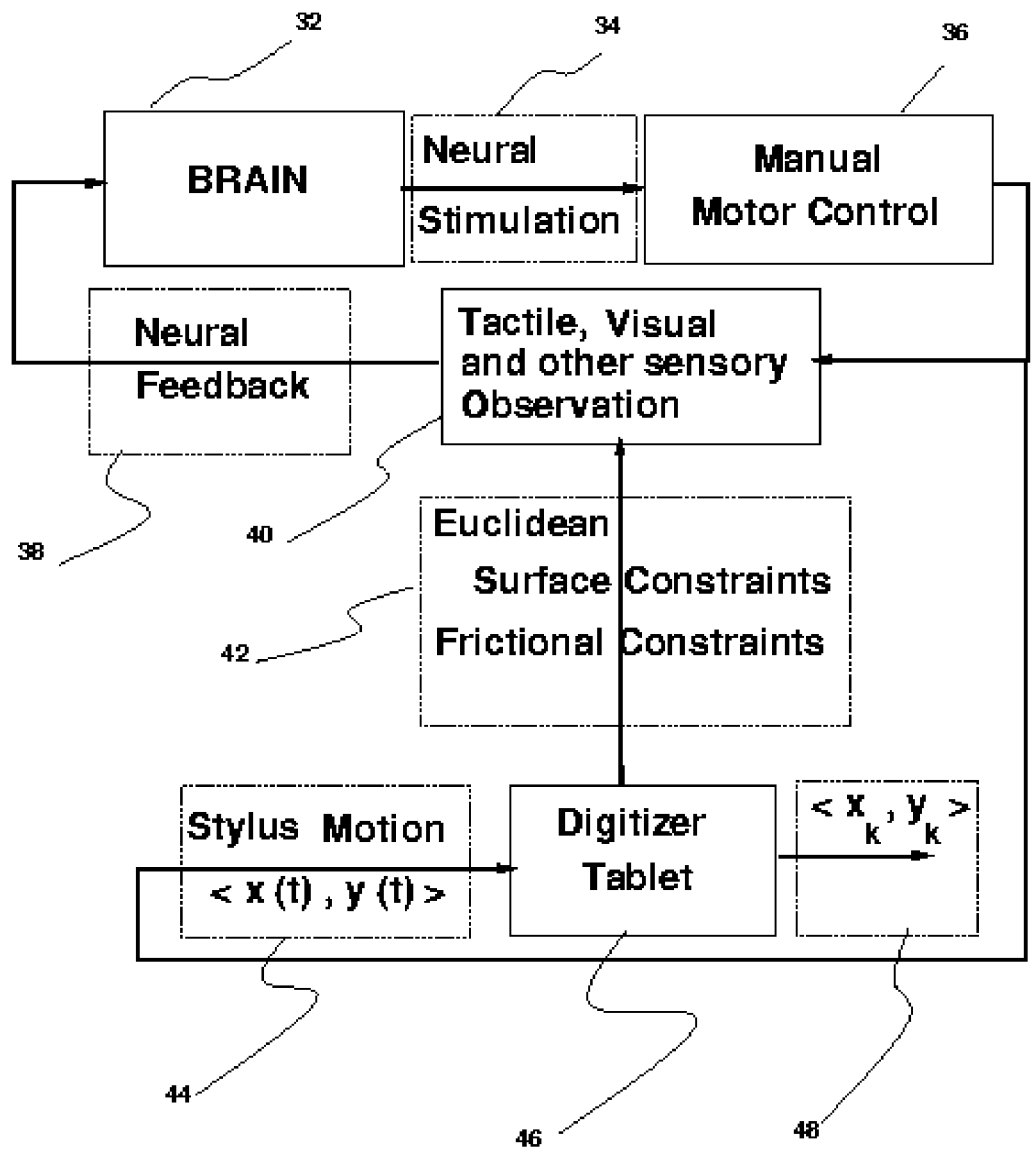
FIG. 2 represents the process of writing as performed by the human system.

FIG. 2 illustrates a representation of this system in block diagram form. The writer of the signature first thinks about producing a signature in his brain 32. The signature creation process is then initiated by the brain producing a neural stimulation 34 to the manual motor control system 36 of the body. This will produce motion of the hand which is in turn observed and felt by visual and tactile and other sensory observations 40. These observations produce neural feedback 38 which go back to the brain. The position of the moving hand also moves the stylus and produces a series of x and y coordinates being generated as a function of time 44. This stylus motion is captured by the digitizer tablet 46. The position of the stylus is further affected by Euclidean constraints since the stylus should remain on the flat surface of the table most of the time and it is further affected by the friction present between the tip of the stylus and the digitizer table surface 42. The result is a set of $x_k$ and $y_k$ which are the sampled coordinates of the tip of the stylus moving on the digitizer tablet and sampled generally at a constant sampling rate (say about 100 Hz)

Having understood the process of signature generation, the coding of the signature is presented.

Figure 3:
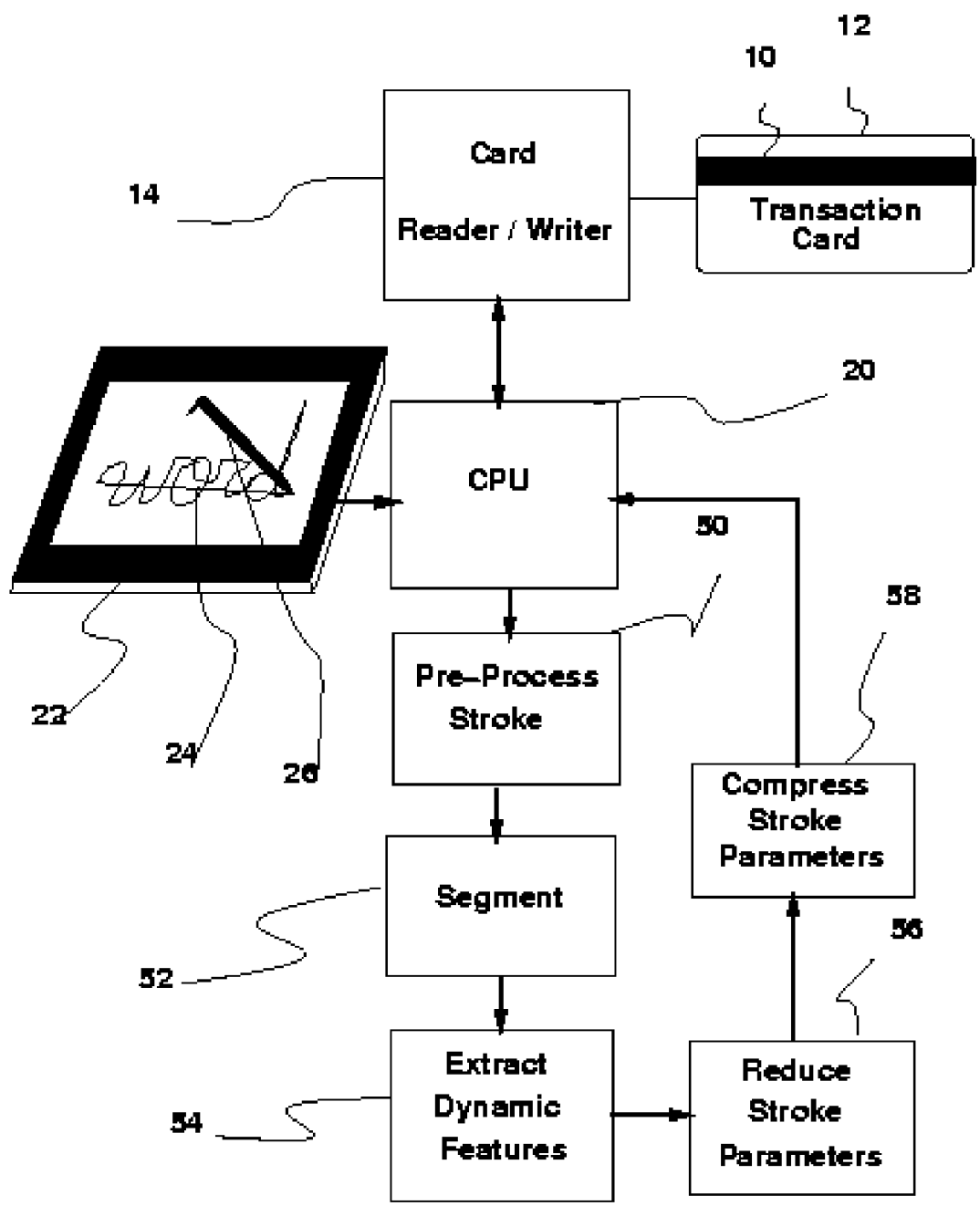
FIG. 3 is an overall block diagram of the signature encoding process.

FIG. 3 illustrates the process of starting with a signature 24 being captured on a digitizer tablet 22 using a stylus 26 and ending up with the coded signature including the dynamic information of the signature on the back 10 of a transaction card 12. In FIG. 3, the main coding and compression process starts with the CPU 20 taking the x, y samples coming from the stylus 26 and sending it to a pre-processor which would take care of normalizing the stroke (a piece of the writing starting with the point where the pen hits the tablet up to the point where it leaves the table) as described by Homayoon S. M. Beigi et al., "Size Normalization in Online Unconstrained Handwriting Recognition", ICIP94, pages 169-172, 1994. This removes inconsistencies due to changes in the mean velocity (signing fast or slowly) and makes the template more robust to the different writing speeds—for example when the signer or writer is in a rush.

Figure 4:
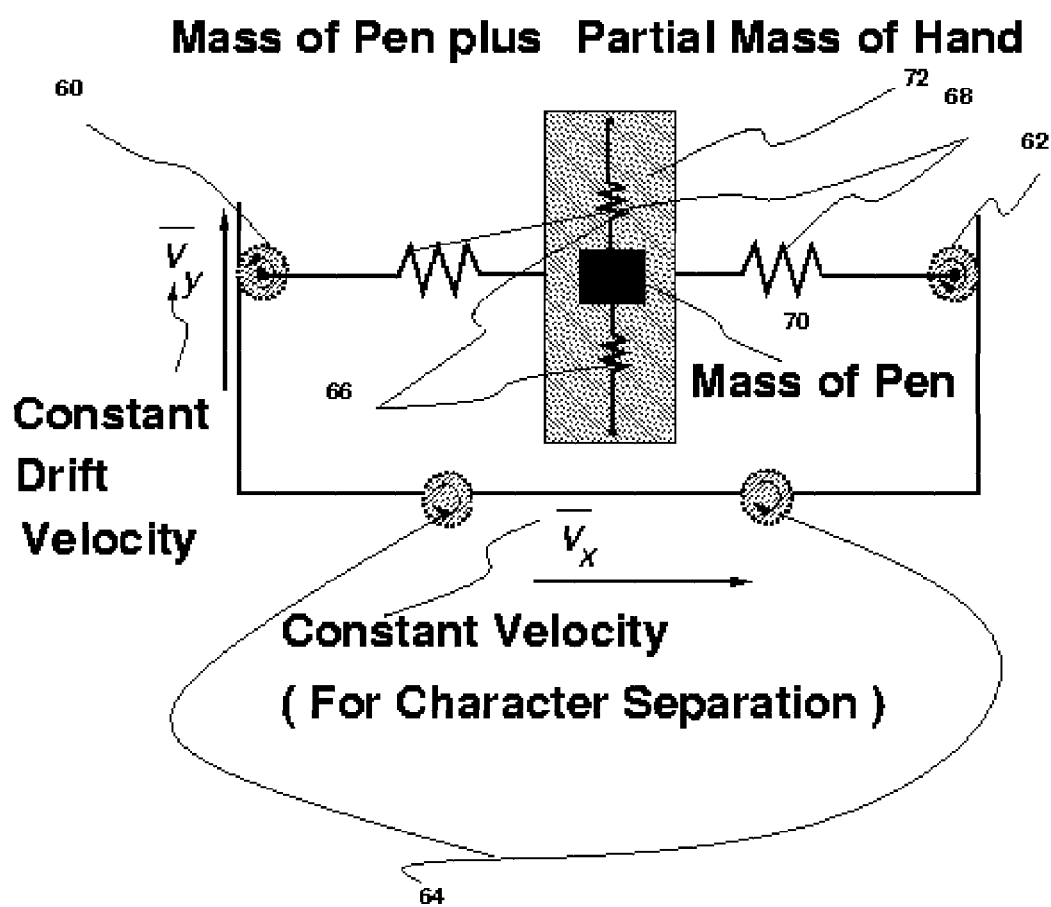
FIG. 4 is an approximate model to the dynamics of human hand motion while signing.

FIG. 4 is used to demonstrate a model which may be used to approximate the dynamics of the hand and the stylus when moving on the digitizer tablet. In this illustration, the partial mass of the hand which is important in dictating the dynamics of the stylus is modeled by 72. Mass of the stylus 70 is considered to be attached to the mass of the hand through springs 66. This accounts for the stiffness of the fingers holding the stylus. The total mass of the pen 70 plus the effective mass of the hand 72 are attached using springs 68 to a moving reference frame represented by two rolling wheels 60 and 62 which are free to move along the y access. The whole hand holding the stylus also moves horizontally while producing the handwriting. This is shown by rollers 64 moving along the x coordinate direction. This horizontal movement has a mean velocity at which the whole hand moves horizontally and it dictates the way characters are separated. The mean velocity in the y direction should be zero if no drift is to take place. FIG. 4 suggests that a good model for the hand and stylus motion would be a coupled second order mechanical system which results in a second order solution of the differential equations of motion. This means that the solution of the position is in the form of sines and cosines. In addition, for such a system, the velocity would also be of the same form since it is the derivate of the position with respect to dependent variable time (t). Considering a mechanical system with second order equations and a solution in terms of sines and cosines, it makes sense to segment the strokes into pieces whose extreme points have either of the x or y velocities at 0. Since the model as presented by FIG. 4 is only an approximation for a nonlinear mechanical system, it would make sense to consider parameters of the sines and cosines representing the soution to be constant for the segments given in FIG. 5. Since the hand has to change its direction at zero velocity points, the dynamics are likely to change drastically at these extreme points. However, since the hand is governed more or less by a second order dynamical system, it cannot abruptly change its parameters before coming to a zero velocity condition. Points 74, 76, 78, 80, 82, 84 and 86 are such critical points. Also note that for a segment from 76 to 78, there is not much movement and hence one of these points should be deleted. In this example 76 is deleted since at 78 both x and y velocities are zero and hence it is a more significant critical point. This segmentation describes block 52 of FIG. 3.

Figure 5:
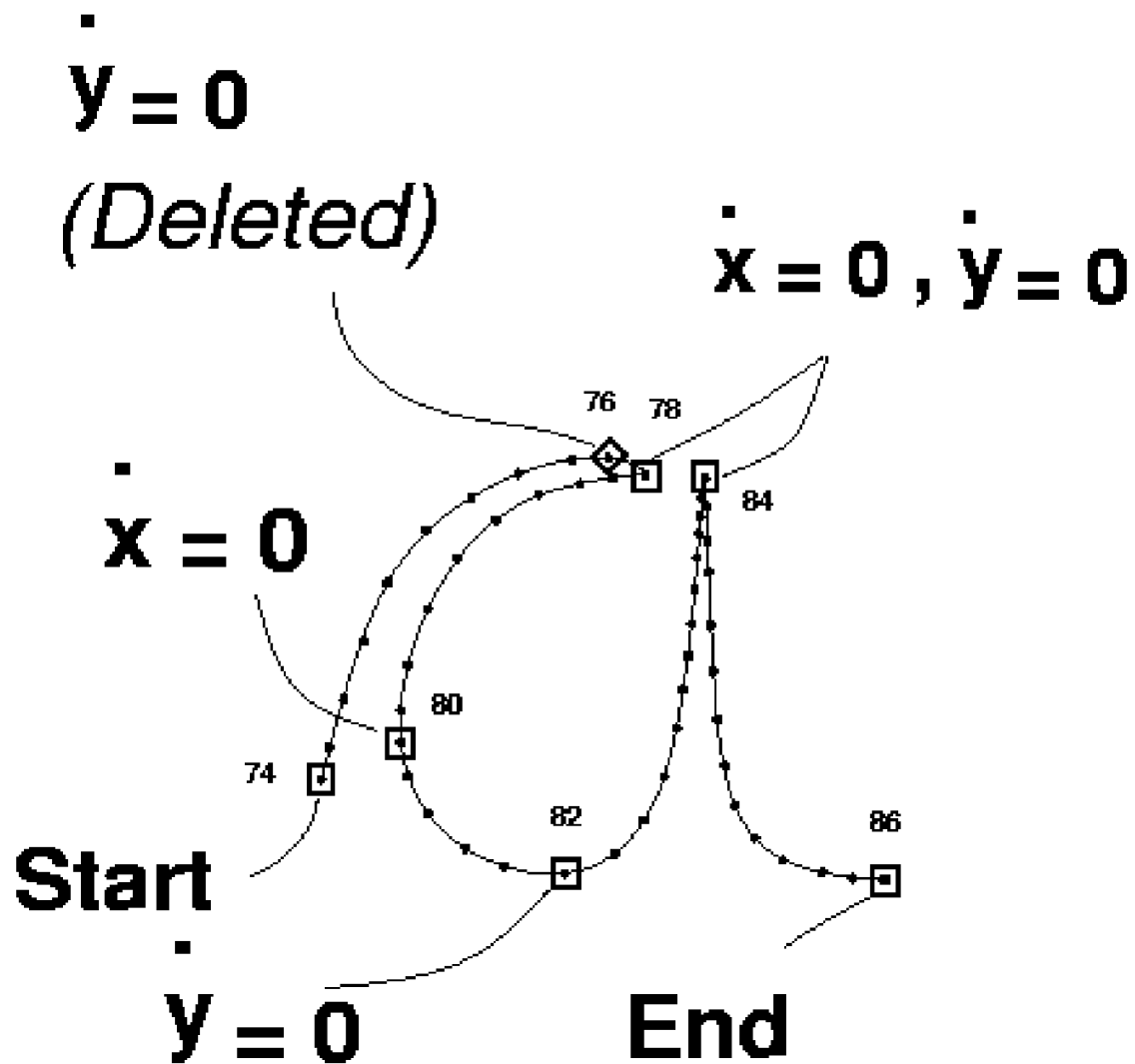
FIG. 5 is an example illustrating the segmentation and reduction process of the handwritten stroke in the signature.

Block 54 in FIG. 3 is where dynamic features are extracted which represent each segment as prescribed by the segmentation scheme of FIG. 5. These features are the parameters which define the sines and cosines representing each segment. The piece between two adjacent zero-velocity values in the x direction may be represented by three parameters. Since a cosine wave is only a sine wave with a phase shift, the three parameters are the amplitude in the x direction $A_x$, the frequency of the sine wave in the x direction given by $\omega_x$ and the phase given by $\phi_x$. There is also the particular part of the solution which is a constant or mean velocity $v_{x\ mean}$.

I have presented the grounds for these approximations in, Homayoon S. M. beigi, "Pre-Processing the Dynamics of On-Line Handwriting Data, Feature Extraction and Recognition," Progress in Handwriting Recognition, A. C. Downtown and S. Impedovo (eds.), World Scientific Publishers, New Jersey, 1997, pp. 191-198. Considering these arguments, let us assume that the differential equations for the handwriting generation process may be tkapproximated by a two dimensional second order differential equation with linear time-invariant coefficients along a piece of writing between any two consecutive extreme positions in each coordinate (x and y), given by FIG. 5. Under these assumptions, the solution of the approximate differential equation, in the nominal region, would be in the usual sine and cosine form.

Therefore, the velocity in each coordinate will also have the same form. For the sake of modeling the handwriting it is better to consider the velocity rather than the position for the apparent reasons of robustness to noise and pre-emphasis. Thus, the velocities in x and y directions under these very crude assumptions would be of the form given in the following equation, $$v_x(t-t\_0)=A_x \sin(\omega_x(t-t\_0)+\phi_x)+v_{x\ mean}$$

$$v_y(t-t\_0)=A_y \sin(\omega_y(t-t\_0)+\phi_y)+v_{y\ mean}$$

where $A_x$, $\omega_x$, $\phi_x$ and $v_{x\ mean}$ are the amplitude, frequency, phase and mean velocity for the x direction. Also, $A_y$, $\omega_y$, $\phi_y$ and $v_y$ are the counterparts in the y direction.

Therefore, the first level of compression is achieved by estimating these six parameters which may be used to reconstruct the segment through an integration process starting from the beginning of the stroke at recorded initial values of x and y. The estimation is formulated as a quadratic optimization problem in Beigi 1997 and solved by minimizing the an error function.

Parameter Reduction 56 in FIG. 3 is necessary to go toward a smaller representation of the signature. The above parametrization of the signal shows reductions in the order of 75% from the loss-less method described earlier in the prior arts section. This leaves the size of an average signature at about 250 bytes which is still not acceptable. One way to do a further reduction in size is to reduce the number of parameters necessary for representing each segment. After looking at 450 signatures, I have seen a correlation of between 75 and 90 percent between the frequencies $\omega_x$ and $\omega_y$. In fact, using $\omega_x$ for both dimensions produces quite acceptable reconstructions while reducing the code-length substantially. If we throw away $\omega_y$ we would be reducing the number of parameters to 5 per segment. Also, we may only store the phase difference $\phi_y - \phi_y$, further reducing the required parameters from 5 to 4.

Parameter Quantization and Tabulation is part of the compression of the stroke parameters as stated by 58 in FIG. 3. To further reduce the code-length, we can study the dynamic range of the above parameters. By looking at the 450 signatures in a corpus, I have noticed that we can get away by using 4 bits to represent the amplitudes. Also, 4 bits are more than enough for keeping the phase difference. Further, the maximum value of 10 rad/s was set as the upper limit of the frequency. Also, a nonlinear table may be generated based on data for each parameter to be able to get a better resolution in smaller variations. The frequency was code with 5 bits and was forced to be positive. In this fashion, only 17 bits were needed to represent each segment. This brought the number of bytes necessary for an average signature to about 140 bytes. The average number of windows was 61. The maximum number of frames was 133 within the 450 signatures in our database.

Another part of 58 may be a coding scheme such as Huffman Coding. We have many features which portray substantial repetition—a great candidate for Huffman Coding, see David A. Huffman, "A Method for the Construction of Minimum-Redundancy Codes," Proceedings of the IRE, September 1952, pp. 1098-1101. A 254-element table was generated from all 450 signatures. In practice, this means that a Huffman Table should be computed from a large corpus of signatures and kept for coding and decoding purposes. Finally, after doing the Huffman coding, the average signature came out to about 52 bytes with the maximum at 84 bytes. Huffman coding is loss-less, so the reconstruction results do not differ from those in the previous section.

I devised a loss-less compression technique as well as a very aggressive lossy technique. The loss-less method results in signature sized in the order of 1000 bytes. The lossy method codes keeps most signatures in less than 57 bytes which is the limit on a magnetic strip on the back of conventional credit cards. As opposed to the image compression, the signature compression may still be used if it overflows the 57-byte limit. We may chose to save as much of the signature as we can possibly fit on the magnetic strip. This would be enough for doing a verification since apparently most signatures are not that long. Future work on signature compression will include the pressure information which is readily available by many tablets today. This code, up to the limit imposed by the magnetic strip may now be written by 14 on 10. Note that for each stroke, the starting point of the stroke as well as the length of the stroke in time should also be stroke to be able to reconstruct the signature fully.

The loss-less compression technique for applications which require exact reconstruction of the handwriting signal from the coded signal. Consider the writing as a sequence of strokes, themselves defined as sequences of x(t) and y(t) coordinates beginning with a pen-down and ending with a pen-up signal. Almost all commercial tablet provide the x(t) and y(t) coordinates at a fixed sampling rate in the order of 100 Hz. In lieu of recording the x(t) and y(t) coordinates directly, one may compute a difference approximation to the local speeds $v_x(t)$ and $v_y(t)$. Since the speed of writing has an upper limit, the number of bits needed to represent $v_x(t)$ and $v_y(t)$ are quite small. Also, by keeping the coordinates of the initial position of each stroke, the stroke may be re-integrated with almost no loss. In fact to avoid any loss, only the $\Delta x$ and $\Delta y$ for each time step are recorded and the computation of the real velocity is not even attempted. A Huffman coding scenario is discussed which may be used to code these differences in a table with variable number of bits representing the data. Less frequent differences are coded with longer number of bits and more frequent ones are coded with less bits. This compression proves to be very practical and provides considerable compression of the on-line data without loss of the sequence and velocity information. This method creates signature codes of about 1000 bytes which is not even close to the space available to us (57 bytes) on the back of a transaction card.

Figure 6:
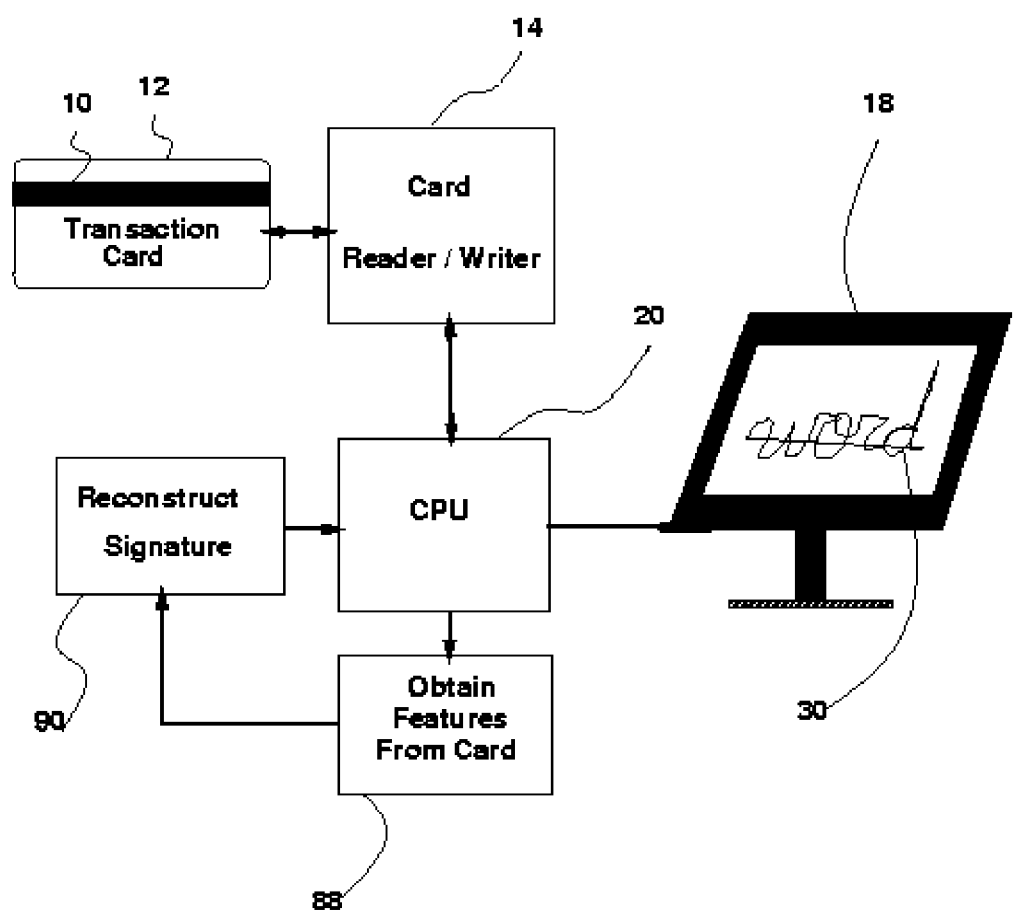
FIG. 6 is a block diagram of the reconstruction process which reconstructs the image of the signature from the parameters stored on the transaction card and displays the result.

FIG. 6 show the block diagram for using the coded information using th lossy method of FIG. 3 to reconstruct the signature image and make it available on the monitor 18. In this system, the code is read back from the transaction card and passed along to the software to reconstruct 90 the signature 30. The Reconstruction block 90 starts with the initial position and length of each stroke and then uses the Huffman code from the Huffman table to decode the parameter values which had been reduced in FIG. 3. Once the parameters for the sine are extracted, the velocity equation is written out using the extracted parameters. The velocity is then integrated using the initial conditions which have been stored. It is integrated numerically to the length of the stroke given in time units. The resulting x and y coordinates are then added to the constant velocity for the stroke and then plotted to form the signature 30.

Figure 7:
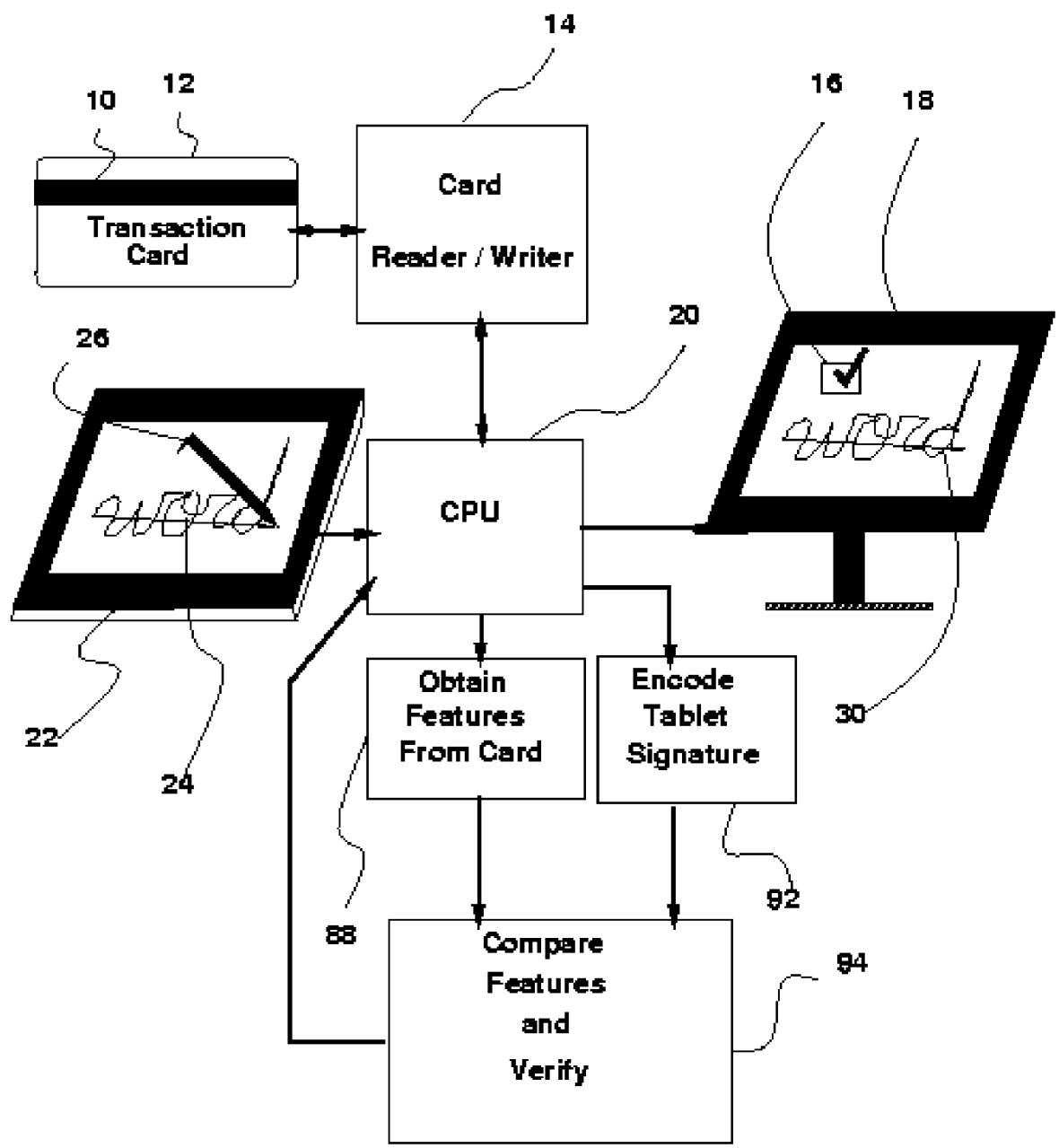
FIG. 7 is the overall block diagram of the verification system comparing the dynamics and shape of the signature template on the back of the transaction card with that produced live by the signer.

FIG. 7 shows the block diagram for the signature verification system. This system is comprised of a comparison system 94 which compares the parameters provided by the storage on the transaction card versus the parameters which are derived from the sample signature being entered. The apparatus of FIG. 3 is used to come up with the parameters for the new signature. The parameters are then compared against each other and a metric is used to provide a difference between the parameters of the signature and the template. Statistical results may be used to come up with thresholds in the acceptable difference in the distortion measure between the two signatures. Any of many distortion measures such as Euclidean, Mahalanobis and Kullback-Leibler distortion measures may be used to come up with the difference in the parameters. Depending on the result of the comparison, a verification or rejection may be displayed 16.

Figure 8:
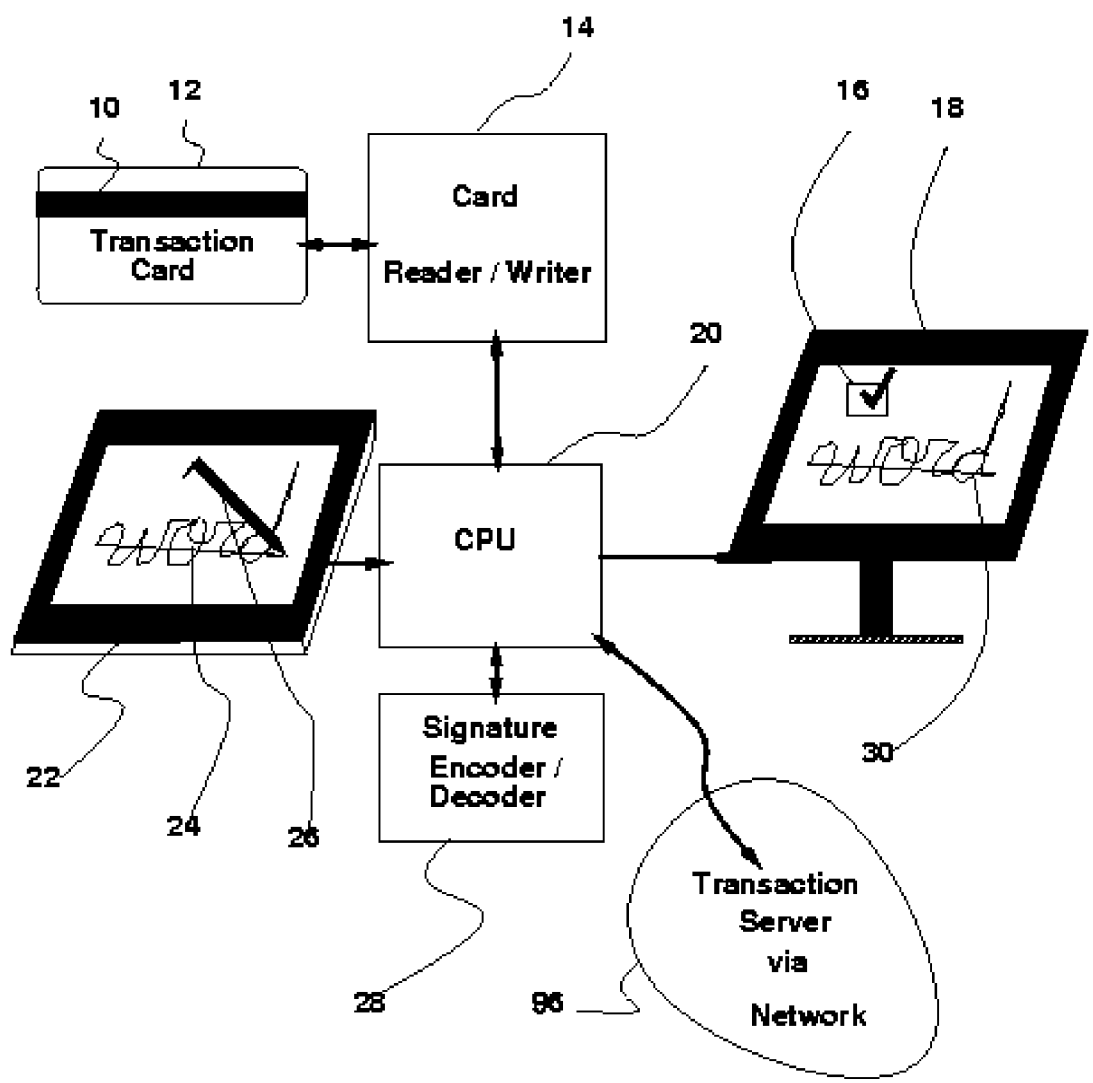
FIG. 8 represents the added possibility of using information from a networked transaction server to do a more advanced verification and authentication.

FIG. 8 adds another level of complexity to system 100, namely, a transaction server 96 which is connected to the system via a network. Under normal circumstances when a credit or a debit card is used, a transaction server is connected which provides credit limits and other information about the customer. The transaction Server 96 may be utilized to handle cases where the scores are undecidable in the verification of the signature against the template residing on the back of the card. Also, the transaction server 96 may be used to keep track of the scores of signatures being entered so that they may be refreshed in the future.

What is claimed is:

1. In a system that captures handwriting on a digitizer tablet, a method performed by a processor for generating and storing data representing the handwriting comprising:

said processor processing the captured handwriting to identify strokes of the handwriting;

said processor partitioning each stroke into a plurality of segments;

said processor generating a plurality of parameters for each segment;

said processor generating a compressed representation for each given segment by transforming the parameters for the given segment;

said processor generating data representing the handwriting based upon the compressed representation for each given segment; and said processor storing the data representing the handwriting.

2. The method of claim 1, wherein:

the partitioning involves identifying points with zero velocity along a predetermined direction.

3. The method of claim 2, wherein:

the predetermined direction is selected from the group including an x direction and a y direction.

4. The method of claim 1, wherein:

the plurality of parameters for a given segment are dynamic features derived from a second order mechanical model of a hand and stylus movement on the digitizer tablet.

5. The method of claim 1, wherein:

the parameters for a given segment represent velocity along two orthogonal directions.

6. The method of claim 5, wherein:

the parameters for a given segment include
   i) first components representing amplitude for each one of the two orthogonal directions;
   ii) second components representing frequency for each one of the two orthogonal directions;
   iii) third components representing phase for each one of the two orthogonal directions;
   iv) fourth components representing mean velocity for each one of the two orthogonal directions; and
   v) a fifth component representing initial position of the given segment.

7. The method of claim 6, wherein:

the transforming of the parameters of a given segment comprises reducing the number of parameters for the given segment.

8. The method of claim 7, wherein:

reducing the number of parameters for the given segment is accomplished by using one of the second components associated with a corresponding one of the two orthogonal directions to represent frequency for the segment along both of the two orthogonal directions.

9. The method of claim 7, wherein:
reducing the number of parameters for the given segment is accomplished by using the phase difference between the third components for the two orthogonal directions to represent phase for the segment.

10. The method of claim 5, wherein:
the transforming of the parameters of a given segment comprises reducing bit length quantization of at least one component of the parameters of the segment.

11. The method of claim 10, wherein:
reducing bit length quantization of at least one component of the parameters of the segment is accomplished by using 4 bits to represent each one of the first components for the two orthogonal directions.

12. The method of claim 10, wherein:
reducing bit length quantization of at least one component of the parameters of the segment is accomplished by using 5 bits to represent each one of the second components for the two orthogonal directions.

13. The method of claim 1, wherein:
the transforming of the parameters of a given segment comprises reducing bit length quantization of data derived from the parameters of the segment.

14. The method of claim 13, wherein:
comprises reducing bit length quantization of data derived from the parameters of the segment is accomplished by using 4 bits to represent a phase difference along two orthogonal directions for the segment.

15. The method of claim 1, further comprising:
generating a non-linear table associated with a given parameter to provide increased resolution.

16. The method of claim 1, further comprising:
applying a coding scheme to the data representing the handwriting.

17. The method of claim 16, wherein:
the coding scheme employs Huffman Coding.

18. The method of claim 1, wherein:
the handwriting is a signature.

19. The method of claim 1, wherein:
the data representing the handwriting is stored on the memory of a transaction card.

20. The method of claim 19, wherein:
the data representing the handwriting is stored on media in accordance with ISO-7811/2 standards.

21. In a system that captures a handwriting sample on a digitizer tablet, a method embodied by a processor for verification of the handwriting sample comprising:
said processor storing data representing a handwriting signal in accordance with the method of claim 10;
said processor accessing the stored data representing the handwriting signal and converting such data to parameters for the segments of the handwriting signal;
said processor processing the captured handwriting sample to generate parameters for segments of the handwriting sample; and
said processor comparing the parameters of the segments of the handwriting signal to the parameters of the segments of the handwriting sample to make a verification decision.

22. A method according to claim 21, wherein:
the comparing involves calculating a distortion measure between the parameters of the segments of the handwriting signal and the parameters of the segments of the handwriting sample.

23. A method according to claim 21, further comprising:
said processor processing the parameters for the segments of the handwriting signal to reconstruct the handwriting signal for display.

* * * * *